United States Patent
Kim

(10) Patent No.: US 7,232,622 B2
(45) Date of Patent: Jun. 19, 2007

(54) FUEL CELL SYSTEM COMPRISING AN ABSORBENT TANK FOR REMOVING RESIDUE THEREIN

(75) Inventor: Sae Hoon Kim, Suwon (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 546 days.

(21) Appl. No.: 10/747,884

(22) Filed: Dec. 29, 2003

(65) Prior Publication Data

US 2005/0008928 A1    Jan. 13, 2005

(30) Foreign Application Priority Data

Jul. 11, 2003    (KR) ............... 10-2003-0047160

(51) Int. Cl.
*H01M 8/04*    (2006.01)

(52) U.S. Cl. .................. 429/25; 429/38
(58) Field of Classification Search .......... 429/25, 429/38

See application file for complete search history.

(56) References Cited

FOREIGN PATENT DOCUMENTS

| EP | 0750361 B1 | 12/1996 |
|---|---|---|
| JP | 2001-185193 | 7/2001 |
| JP | 2002-305017 | 10/2002 |
| WO | WO 02/054521 A1 | 7/2002 |

*Primary Examiner*—Gregg Cantelmo
(74) *Attorney, Agent, or Firm*—Morgan Lewis & Bockius LLP

(57) ABSTRACT

When operation of a fuel cell system has completed, residue in the fuel cell system such as water, fuel gas, and oxidant are removed by adsorbent stored in an adsorbent tank, which is connected to flow fields of the fuel cell system.

7 Claims, 3 Drawing Sheets

FUEL CELL SYSTEM COMPRISING AN ABSORBENT TANK FOR REMOVING RESIDUE THEREIN

CROSS-REFERENCE TO RELATED APPLICATIONS

This application claims priority of Korean Application No. 10-2003-0047160, filed on Jul. 11, 2003, the disclosure of which is incorporated fully herein by reference.

FIELD OF THE INVENTION

This invention relates to a fuel cell system, and more particularly to an apparatus and method for removing residue in a fuel cell system, such as oxidant, fuel gas, and water.

BACKGROUND OF THE INVENTION

Generally, a fuel cell system, having a fuel cell stack, a oxidant flow field, a fuel gas flow field, and a coolant flow field, generates electric energy utilizing an electrochemical reaction between a fuel gas and an oxidant. Such a fuel cell system is generally provided with a Membrane Electrode Assembly (MEA).

The MEA has a membrane electrolyte sandwiched between an anode supplied with humidified fuel gas and a cathode supplied with humidified oxidant. The MEA is again sandwiched between a pair of separators, where flow fields, which are defined as a plurality of channels or grooves, are formed for flowing of the fuel gas and oxidant.

Furthermore, the fuel cell system is provided with a coolant flow field for cooling the fuel cell stack. Each of the oxidant flow field, the fuel gas flow field, and the coolant flow field is provided with a pump, a blower, and a plurality of valves and so on.

When a fuel cell as described above is adapted in a fuel cell vehicle, the fuel cell is repeatedly turned on and off, dependant on whether the vehicle is driven or not. When the fuel cell operates, water generated by electrochemical reaction of the fuel cell is drained, but when the fuel cell stops operating, water failing to be drained remains in the fuel cell stack. Furthermore, when the fuel cell stops operating after driving, the humidified fuel gas and the humidified oxidant in the flow fields also remain in the plurality of grooves or channels. When the atmospheric temperature drops to a low temperature, water of the residue can freeze, deteriorating the MEA of the fuel cell and blocking the flow fields, and the parts provided with each of the flow fields. Accordingly, in order to guarantee the safety of the fuel cell, the residue in the fuel cell system must be removed after the fuel cell is turned off.

Conventionally, in order to solve the problem described above, the residue in the fuel cell is removed by nitrogen purging. However, when nitrogen purging is used, additional apparatuses such as a storage tank for nitrogen and a controller for adjusting the nitrogen pressure are required, and the storage tank must be repeatedly recharged. Furthermore, in order to completely remove the residue, a substantial amount of time and high consumption of nitrogen are required.

SUMMARY OF THE INVENTION

Therefore, the objective of this invention is to solve the problems described above and to provide an apparatus for removing residue in a fuel cell such as oxidant, fuel gas, and water, and a method thereof.

An exemplary apparatus for removing residue in a fuel cell system having a plurality of flow fields for fuel gas and for oxidant comprises an adsorbent tank storing an adsorbent therein for adsorbing the residue sent from the fuel cell system; a vacuum pump connected to the adsorbent tank for separating the residue adsorbed by the adsorbent; a pressure gauge for determining the pressure of the absorbent tank; first shut off valves mounted on input passages to the flow fields; second shut off valves mounted on output passages from the flow fields; third shut off valves mounted on input passages to the adsorbent tank, which are diverged from the output passages between the flow fields and the second shut off valves; and a fourth shut off valve mounted on an output passage from the adsorbent tank to the vacuum pump.

An exemplary method for removing residue in a fuel cell system having a plurality of flow fields for fuel gas and for oxidant comprises insulating input passages and output passages of the plurality of flow fields when driving of the fuel cell stack stops; communicating the plurality of flow fields with an adsorbent tank storing adsorbent for adsorbing the residue in the fuel cell system; and separating the residue adsorbed by the adsorbent by driving a vacuum pump connected to the adsorbent tank.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will hereinafter be described in detail with reference to the accompanying drawings.

Figure 1:
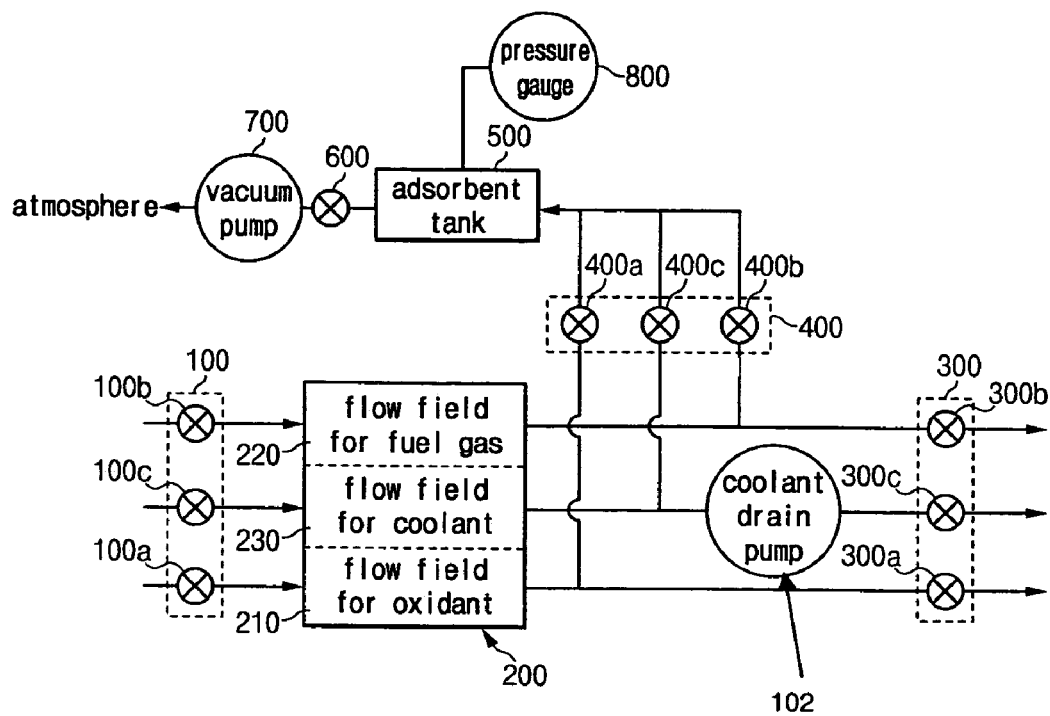
FIG. 1 is a schematic view of an apparatus for removing residue in a fuel cell system according to a first embodiment of this invention.

FIG. 1 is a schematic view of an apparatus for removing residue in a fuel cell system according to the first embodiment of this invention. As shown in FIG. 1, a fuel cell system 200 has a plurality of flow fields therein. The plurality of flow fields comprise a flow field for oxidant 210, a flow field for fuel gas 220, and a flow field for coolant 230. The flow fields 210, 220, 230 are respectively connected to input passages and output passages.

First shut off valves 100 are mounted on the input passages to the fuel cell system 200, and second shut off valves 300 are mounted on the output passages from the fuel cell system 200.

Input passages to an adsorbent tank 500 are diverged from the output passages between the flow fields 210, 220, 230 and second shut off valves 300 through third shut off valves 400 that are mounted on the input passages to the adsorbent tank 500.

An output passage from the adsorbent tank 500 is connected to a vacuum pump 700 through a fourth shut off valve 600 that is mounted on the output passage from the adsorbent tank 500.

The adsorbent tank 500 contains adsorbents that are capable of adsorbing fuel gas, oxidant, and water. Preferably, the adsorbent is provided is zeolite or silicagel. A plurality of adsorbent layers are formed throughout the adsorbent tank 500 so that a specific adsorbent can be selected according to the residue.

Furthermore, in order to determine the pressure of the adsorbent tank 500, a pressure gauge 800 is coupled to the adsorbent tank 500.

The vacuum pump 700 is connected to the adsorbent tank 500 such that the residue, such as fuel gas, oxidant, and water, adsorbed by the adsorbent in the adsorbent tank 500 are eliminated by operation of the vacuum pump 700.

Preferably, a coolant drain pump 102 is mounted on the output passage from the flow field for coolant 230 so that coolant remaining after operating the fuel cell system 200 is drained. Hereinafter, the operation of the apparatus for removing the residue in the fuel cell system is described.

During operation of the fuel cell, the first shut off valves 100 (100a, 100b, 100c) and the second shut off valves 300 (300a, 300b, 300c) are open, and the third shut off valves 400 (400a, 400b, 400c) are closed.

When the operation of the fuel cell system 200 stops, the electrochemical reaction in the fuel cell system 200 ceases. Accordingly, in the flow fields 210, 220 formed in the fuel cell system 200, fuel gas and oxidant supplied during the operation of the fuel cell system, and water generated by the electrochemical reaction, remain as residue. Specifically, oxidant and water remain in the flow field for oxidant 210, fuel gas and water remain in the flow field for fuel gas 220, and coolant remains in the flow field for coolant 230 in the fuel cell system 200.

If the coolant in the flow field for coolant 230 is water, it can be frozen when the atmospheric temperature falls to a low temperature, along with the water produced during the electrochemical reaction. Accordingly, the coolant drain pump 102, which is connected to the output passage from the flow field for coolant 230, is operated such the coolant is drained from the fuel cell system 200. Even though the coolant drain pump is operated, a small quantity of coolant remains in the flow field for coolant 230, such that it is required to remove the remaining coolant completely by the adsorbing process described below.

Alternately, if the coolant is an anti-freezing solution, it is not required to remove the coolant. In this embodiment the plurality of passages connected to the flow field for coolant 230, the shut off valves 100c, 300c, 400c, and the coolant drain pump are omitted.

When draining of the coolant has completed, the first shut off valves 100 (100a, 100b, 100c) and the second shut off valves 300 (300a, 300b, 300c) are closed. Accordingly, the flow fields 210, 220, 230 are insulated. Subsequently, the third shut off valves 400 (400a, 400b, 400c) are opened such that the flow fields 210, 220, 230 of the fuel cell system 200 communicate with the adsorbent tank 500. Accordingly, the amount of residue remaining in flow fields 210, 220, 230 of the fuel cell system 200 is decreased by the adsorbing of the adsorbent in the adsorbent tank 500.

Accordingly, the fuel gas, oxidant, and water remaining in the flow fields 210, 220, 230 move to the adsorbent tank 500 until the adsorbent of the adsorbent tank 500 is saturated. This controls the amount of the residue in the flow fields 210, 200, 230 based on the amount of the adsorbent in the adsorbent tank 500.

If the driving of the fuel cell system 200 is restarted after the residue is adsorbed into the adsorbent, the first shut off valves 100 (100a, 100b, 100c) and the second shut off valves 300 (300a, 300b, 300c) are opened, while the third shut off valves 400 (400a, 400b, 400c) are operated to be closed. When the fuel cell system 200 is operated the temperature of the fuel cell system 200 can reach a range of 60~80° C. The heat emitted from the fuel cell system 200 is transferred to the adsorbent tank 500 such that the pressure of the adsorbent tank 500 is increased.

When the pressure of the adsorbent tank 500, which is determined by the pressure gauge 800, reaches a predetermined pressure because of the transferred heat from the fuel cell system 200, the fourth shut off valve 600 is opened and the vacuum pump 800 is driven such that the adsorbed residue is separated from the adsorbent in the adsorbent tank 500. As the pressure increases in the adsorbent tank 500, the load applied to the vacuum pump 700 is decreased such that the adsorbed residue can be easily separated from the adsorbent.

Further, if the pressure of the adsorbent tank, which is determined by the pressure gauge 800, does not fluctuate, it is determined that the separation of the residue has completed. Accordingly, the fourth shut off valve 600 is closed and preparation for the next adsorbing is completed.

Figure 2:
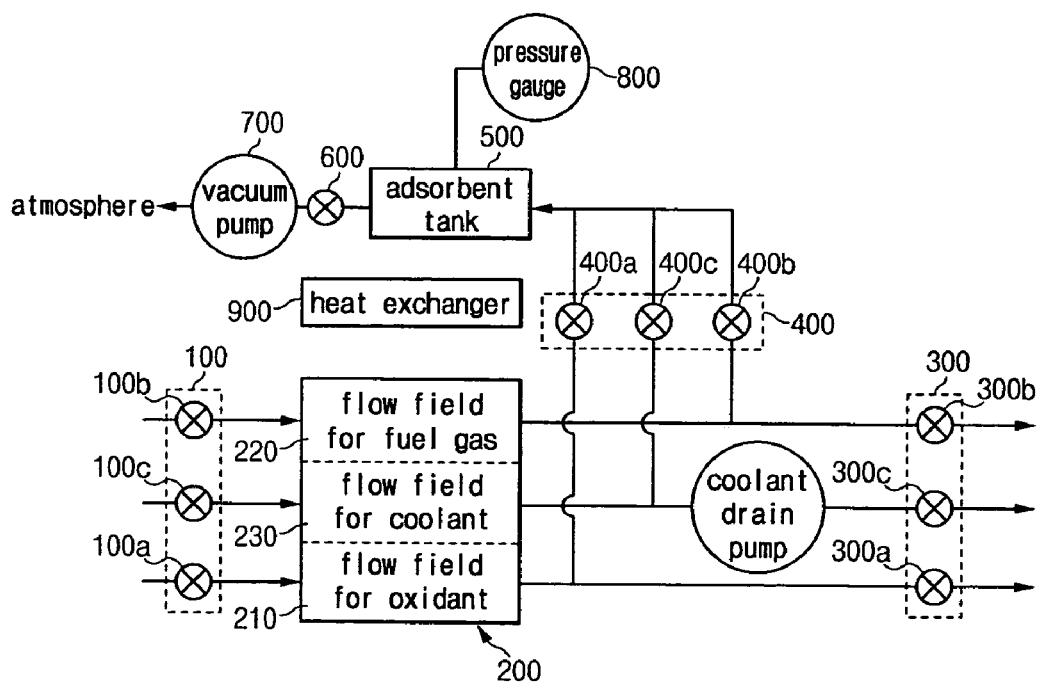
FIG. 2 is a schematic view of an apparatus for removing residue in a fuel cell system according to a second embodiment of this invention.

FIG. 2 is a schematic view of an apparatus for removing residue in a fuel cell system according to a second embodiment of this invention. As shown in FIG. 2, the second embodiment of this invention is further provided with a heat exchanger 900.

The heat exchanger 900 is interposed between the fuel cell system 200 and the adsorbent tank 500 such that the heat transfer rate can be increased. Accordingly, the pressure of the adsorbent tank 500 more rapidly reaches the predetermined pressure and the adsorbed residue including fuel gas, oxidant, and water is more rapidly exhausted to the air.

Figure 3:
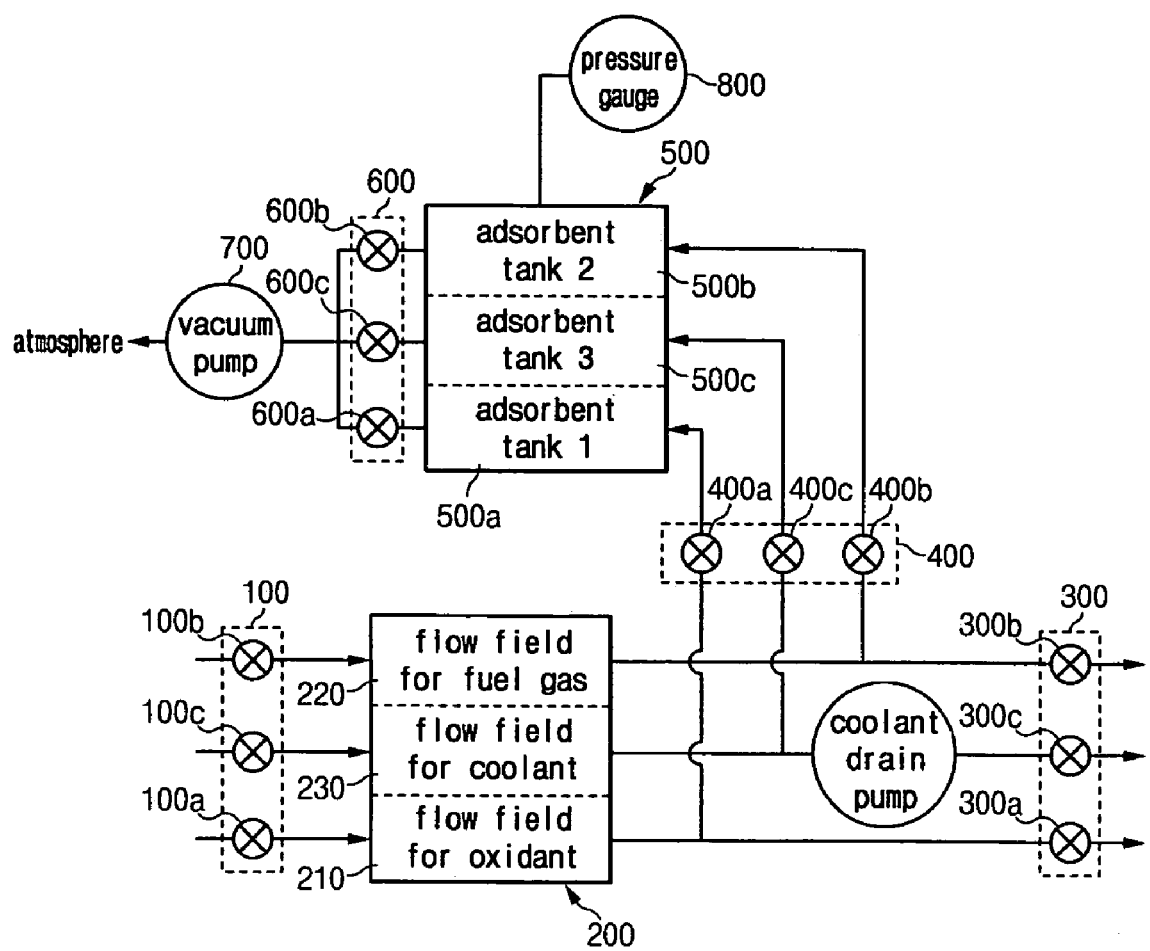
FIG. 3 is a schematic view of an apparatus for removing residue in a fuel cell system according to a third embodiment of this invention.

FIG. 3 is a schematic view of an apparatus for removing residue in a fuel cell system according to a third embodiment of this invention. As shown in FIG. 3, the inner space of the adsorbent tank 500 is divided into three sections 500a, 500b, 500c corresponding to each of the flow fields 210, 220, 230, and the adsorbent in each section of the adsorbent tanks 500a, 500b, 500c is selected based on the kind of the residue adsorbed to each of the sections 500a, 500b, 500c.

Each of three section 500a, 500b, 500c is respectively connected to each of the input passages to the adsorbent tank 500.

Figure 4:
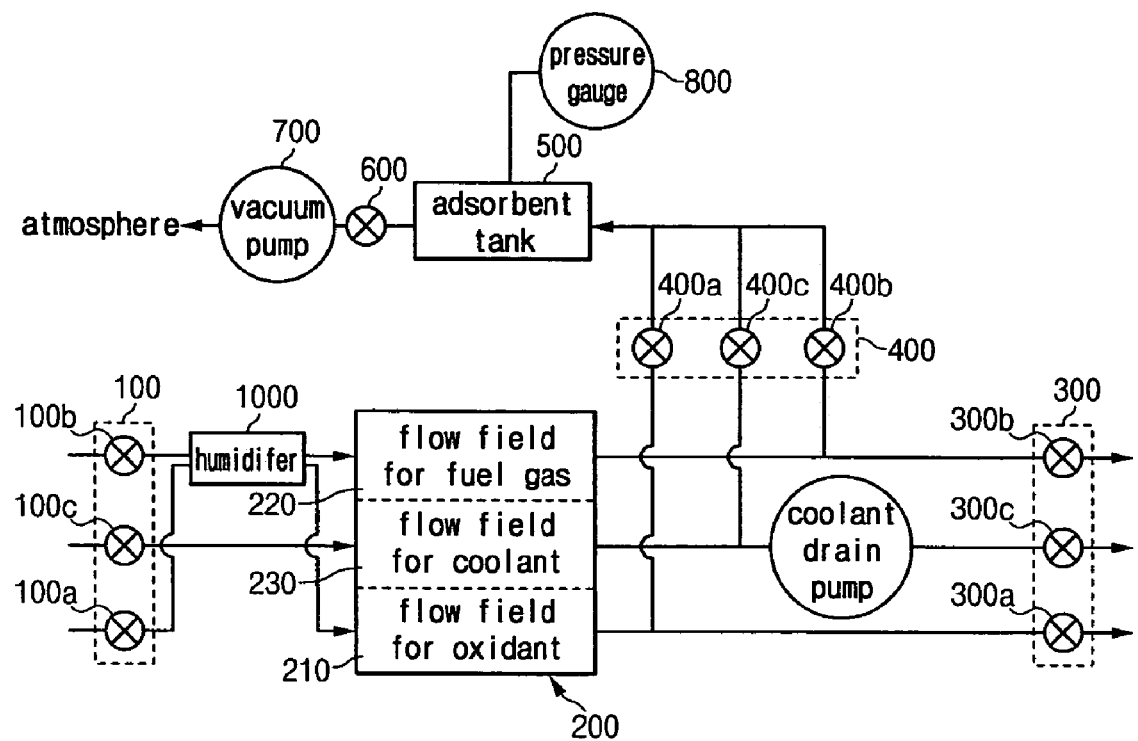
FIG. 4 is a schematic view of an apparatus for removing residue in a fuel cell system according to a fourth embodiment of this invention.

FIG. 4 is a schematic view of an apparatus for removing residue in a fuel cell system according to a fourth embodiment of this invention. As shown in FIG. 4, a humidifier 1000 is connected to the input passages to the flow field for oxidant 210 and flow field for fuel gas 220.

In the case of a fuel cell system including an MEA formed with a solid polymer membrane, it is preferable that the fuel gas and oxidant supplied to the fuel cell system contain a predetermined amount of moisture. Accordingly, the humidifier 1000 is connected to the input passages to the flow field for oxidant 210 and flow field for fuel gas 220.

Preferably, an inner space of the humidifier 1000 is divided into two sections, respectively connected to the flow fields for oxidant 210 and for fuel gas 220.

When the humidifier 1000 is provided, if operation of the fuel cell system 200 is completed, water for humidifying remains in the humidifier 1000 and the flow fields 210, 220 such that it is required to remove the water. Accordingly, as shown in FIG. 4, the remaining water in the humidifier 1000 and in the flow fields 210, 220 is also removed by an operation described above.

Furthermore, the humidifier 1000 can be connected to another pump (not shown) or a water or coolant drain pump such that the water in the humidifier 1000 is removed in advance of adsorbing by the adsorbent. This method is particularly useful when the humidifier 1000 is provided for moisturizing the membrane.

According to the embodiment of this invention, the residue in the flow fields of a fuel cell system is efficiently removed without requiring an additional nitrogen purging apparatus and the resultant consumption of nitrogen.

The foregoing descriptions of specific embodiments of the present invention are presented for purposes of illustration and description. For example, any methods described herein are merely examples intended to illustrate one way of performing the invention. They are not intended to be exhaustive or to limit the invention to the precise forms disclosed. Obviously many modifications and variations are possible in view of the above teachings. Also, any figures or graphs described herein are not drawn to scale. The embodiments were chosen and described in order to best explain the principles of the invention and its practical applications, to thereby enable others skilled in the art to best utilize the invention and various embodiments with various modifications as are suited to the particular use contemplated. Furthermore, the order of steps in the method are not necessarily intended to occur in the sequence laid out. It is intended that the scope of the invention be defined by the following claims and their equivalents.

What is claimed is:

1. An apparatus for removing residue in a fuel cell system having a plurality of flow fields for fuel gas and for oxidant, comprising:

an adsorbent tank storing adsorbent therein for adsorbing the residue from the fuel cell system;

a vacuum pump connected to the adsorbent tank for separating the residue adsorbed by the adsorbent;

a pressure gauge for determining the pressure of the absorbent tank;

first shut off valves mounted on input passages to the flow fields;

second shut off valves mounted on output passages from the flow fields;

third shut off valves mounted on input passages to the adsorbent tank, which are diverged from the output passages between the flow fields and the second shut off valves; and a fourth shut off valve mounted on an output passage from the adsorbent tank to the vacuum pump.

2. The apparatus of claim 1, wherein the plurality of flow fields further includes a flow field for coolant.

3. The apparatus of claim 1, wherein a coolant drain pump is mounted on the output passage from the flow field for coolant.

4. The apparatus of claim 1, wherein the adsorbent is selected from one of zeolite and silica gel.

5. The apparatus of claim 1, wherein an inner space of the adsorbent tank is divided into sections corresponding to the flow field for fuel gas and the flow field for oxidant.

6. The apparatus of claim 5, wherein the adsorbent in each section of the adsorbent tank is selected based on the kind of residue adsorbed in the section.

7. The apparatus of claim 1, further comprising a heat exchanger interposed between a fuel cell stack and the adsorbent tank, transferring emitted heat from the fuel cell stack to the adsorbent tank.

* * * * *